B. A. FULLER.
COMBINED RAILROAD LEVEL AND GAGE.
APPLICATION FILED MAY 25, 1918.
1,296,381.
Patented Mar. 4, 1919.
3 SHEETS—SHEET 1.
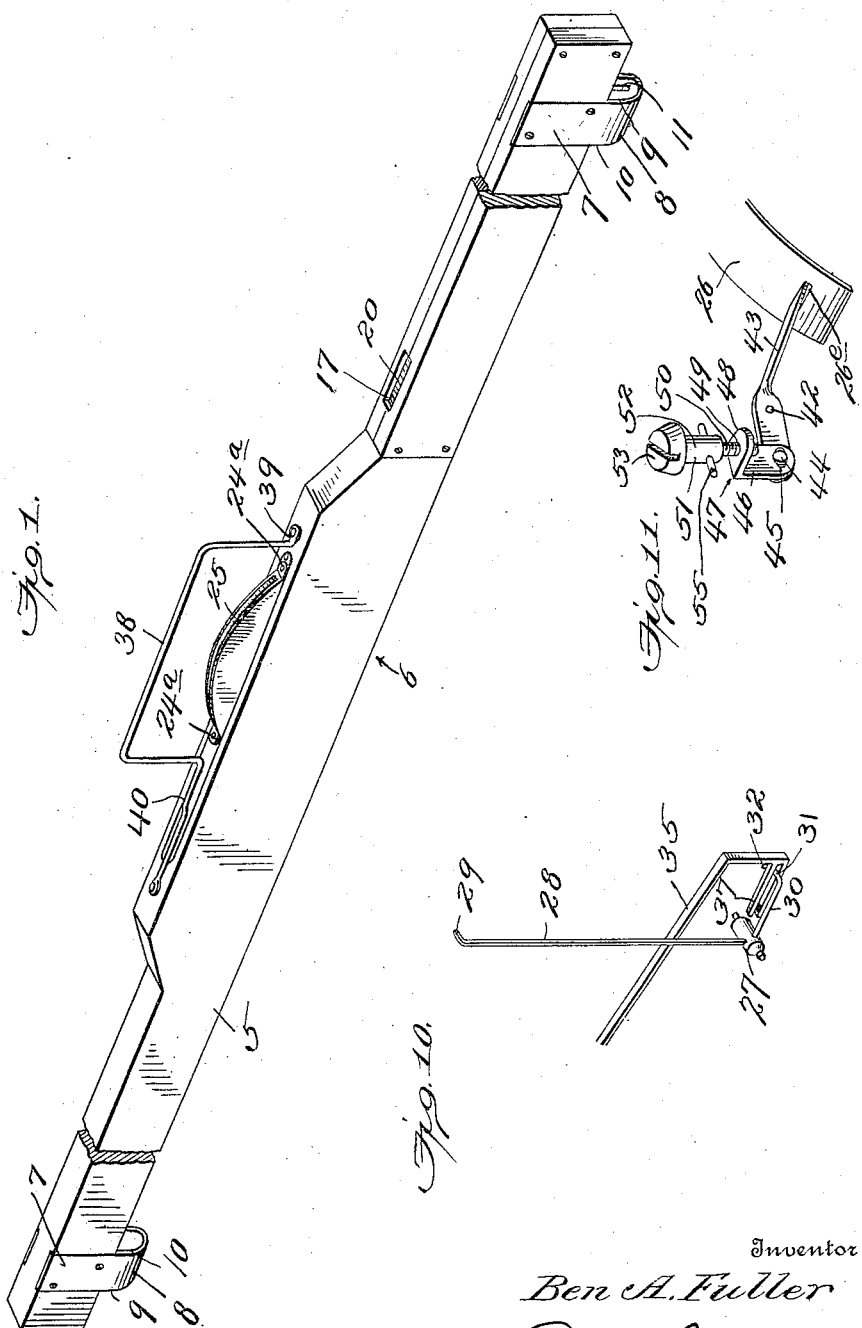
Witness
Chas. S. Hoyer
C. D. Kisler
Inventor
Ben A. Fuller
By
James L. Norris
Attorney

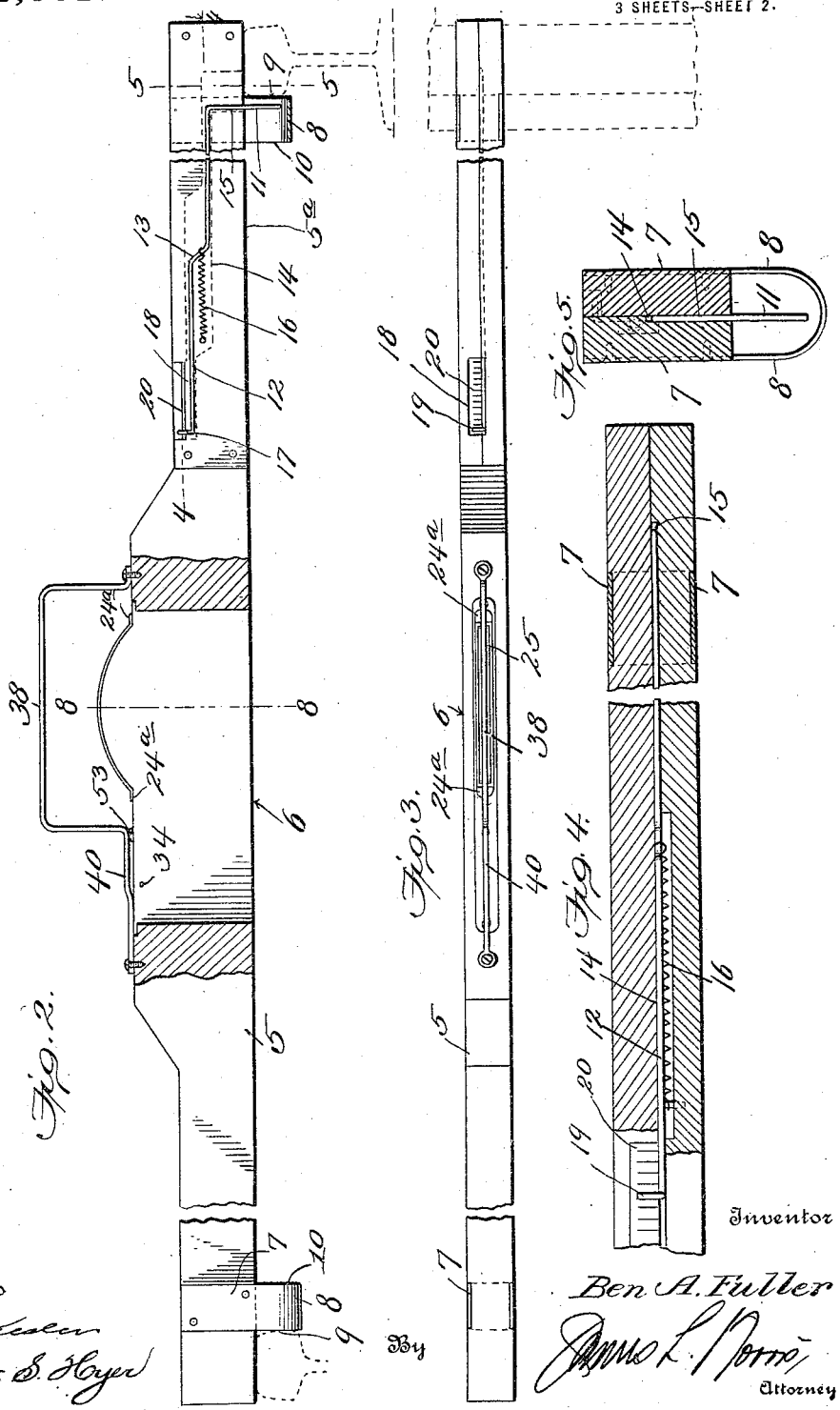

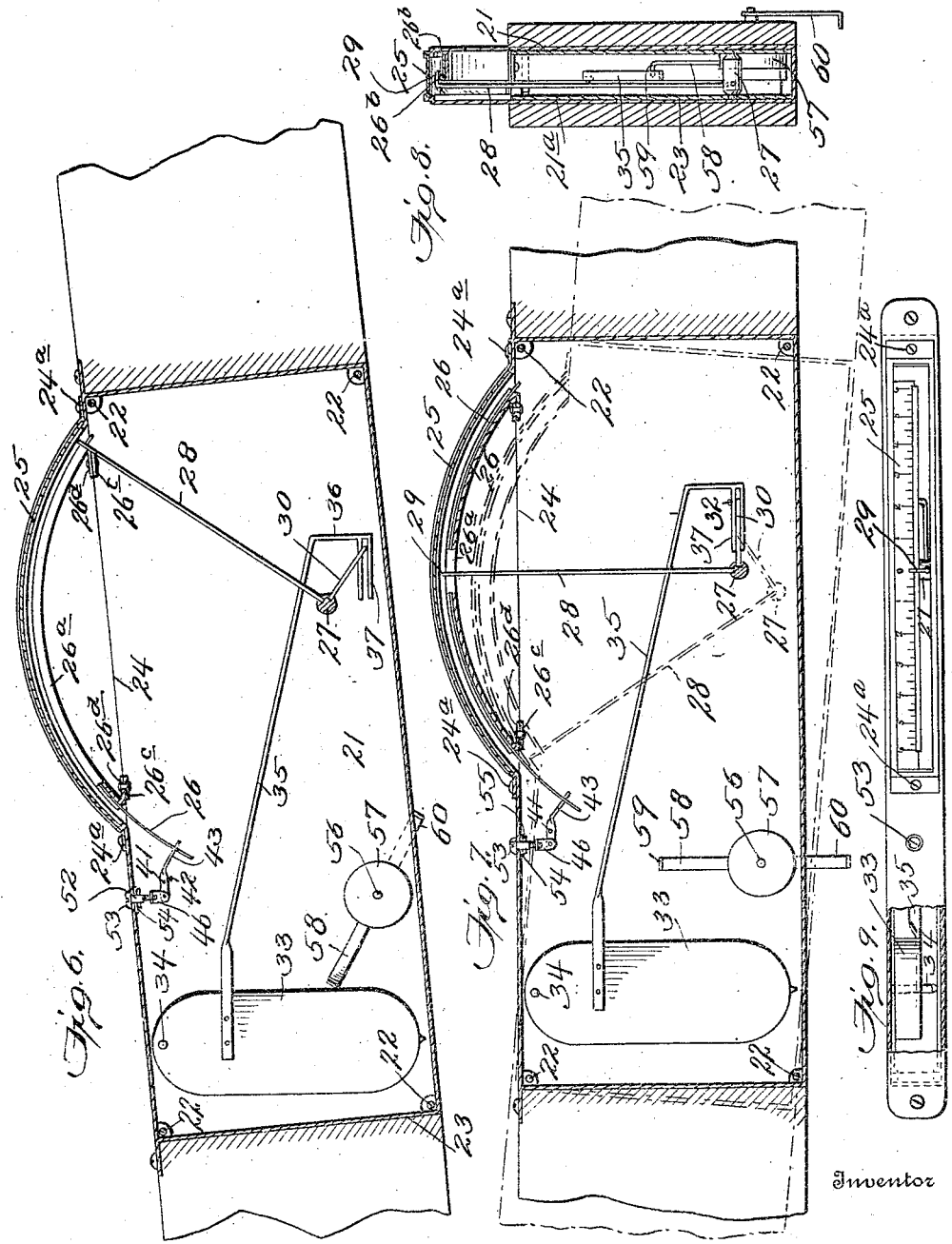

UNITED STATES PATENT OFFICE.

BEN A. FULLER, OF LAMPASAS, TEXAS.

COMBINED RAILROAD LEVEL AND GAGE.

1,296,381.

Specification of Letters Patent.

Patented Mar. 4, 1919.

Application filed May 25, 1918. Serial No. 236,605.

*To all whom it may concern:*

Be it known that I, BEN A. FULLER, a citizen of the United States, residing at Lampasas, in the county of Lampasas and State of Texas, have invented new and useful Improvements in Combined Railroad Levels and Gages, of which the following is a specification.

This invention relates to a combined railroad level and gage, and one of the objects of the same is to provide a compact device of the class specified for quickly and readily determining the condition of railroad tracks as to level or elevation and gage by a simple and effective operation of an organization of elements, the level feature having an automatic actuation to sensitively indicate the extent of irregularity, and the gage in part manually adjustable and including a scale to easily and positively ascertain the least discrepancy in standard gage measurement between rails.

A further object of the invention is to provide a combined railroad level and gage wherein the several parts are simple and strongly assembled and protected against disarrangement or injury during use or vigorous service without liability of disturbance or disorganization of the several parts.

The invention consists in the construction and arrangement of the several parts which will be more fully hereinafter described and claimed.

In the drawings:—

Figure 1 is a perspective view of a combined level and gage broken through at opposite extremities and embodying the features of the invention.

Fig. 2 is a sectional side elevation of the combined level and gage shown broken through at opposite extremities and applied to rails illustrated in dotted lines.

Fig. 3 is a top plan view of the combined level and gage.

Fig. 4 is a horizontal section broken through and taken in the plane of the line 4—4, Fig. 2.

Fig. 5 is an enlarged transverse vertical section taken in the plane of the line 5—5, Fig. 2.

Fig. 6 is an enlarged central longitudinal section of the intermediate portion of the device showing the level mechanism and the operation thereof when disposed at an incline in one direction to the true horizontal.

Fig. 7 is a view similar to Fig. 6 showing the position of the device and level mechanism when in true horizontal position in full lines, and in dotted lines illustrating the change of position of said mechanism when the device is inclined reversely to the angle shown by Fig. 6.

Fig. 8 is a transverse vertical section on the line 8—8, Fig. 2.

Fig. 9 is a top plan view, broken away in part, of the intermediate portion of the device and particularly showing the level scale and counterpiece weight.

Fig. 10 is a detail perspective view of the level indicator or hand and arbor and a portion of the actuating arm therefor.

Fig. 11 is a detail perspective view of a part of the level scale plate and an adjusting attachment therefor.

The numeral 5 designates a stock preferably of wood of suitable dimensions. At the center of the stock is a level mechanism 6, and at each end are fixed rail gage means or stops consisting of flat metal shanks 7 partially embedded vertically in the stock and continuing into depending U-shaped gage loops 8 having their outer and inner vertical edges 9 and 10 disposed at true right angles to the lower edge $5^a$ of the stock, the outer edges 9 of the loops 8 being spaced a distance equal to the standard gage of the rails of a track as now commonly adopted in railroad construction. The one loop 8 serves as a partial inclosure and shield for a supplemental slidable gage arm 11 depending at right angles from a shiftable rod 12 having an intermediate bend 13 and movably mounted to slide in a horizontal slot 14 formed in the body of the stock 5 at a suitable elevation above its lower edge $5^a$, the arm 11 depending through a vertical slot 15 cut through said lower edge $5^a$ and long enough to permit requisite movement of the said arm 11. The rod 12 has a coiled spring 16 secured to the intermediate bend 13, said spring being located in the slot 14 and attached at its inner terminal to the slot wall a suitable distance in rear of said bend 13. The inner or rear end of the rod 12 has an inwardly projecting arm 17 movable through an upwardly opening slot 18 in the stock, said arm 17 having an angular finger or pointer 19 which projects over an inset or countersunk scale 20. When the rod 12 is used and pushed outwardly it operates against the resistance of the spring 16, and consequently, when the rod is released from an extended or adjusted position, said spring pulls the rod inwardly into normal position. The gage arm or terminal 11 of the rod 12 when drawn inwardly into normal position lies within and is protected by the adjacent gage loop 8. By means of this slidable gage attachment and the scale 20, the least discrepancy in the rail gage can be readily ascertained and rectified in accordance with the scale reading. The outward movement or adjustment of the rod 12 is limited by the angular arm 11 engaging the outer terminal or wall of the slot 15.

The level mechanism 6 comprises opposite side plates 21 and 21ª of suitable metal, preferably bronze, connected at the corners by cross-rods or bolts 22, and between these plates the movable parts are mounted, the plates being snugly slipped into a light steel case 23 of a gage proportionate to the general dimensions of the device as shown by Fig. 8. When the plates 21 and 21ª are disposed in the case 23, the lower edges of the said plates rest on the bottom of the case, and the upper edges of the plates are about flush with the upper limits of the sides of the case. The top of the case toward one end is formed with an opening 24, and fixed therein by screw-attached end clips 24ª engaging the case top is an arched transparent or glass cover 25 to expose an arcuate scale plate or strip 26 held in secured position below the same. The scale plate 26 is adjustably held in a support 26ª of similar arcuate form and having inturned guide flanges 26ᵇ for retaining the plate 26 in position. The support 26ª is secured at its ends by clips 26ᶜ attached to horizontal ears or lugs 26ᵈ extending inwardly from the upper edge of the plate 21, said ears or lugs having less length than the distance between the upper edges of the plates 21 and 21ª. The scale plate 26 is divided into suitable fractional measurement marks whereby the normal or abnormal relative elevation of track rails may be accurately ascertained and one end of the plate is formed with a slot 26ᵉ for engagement by a part of an adjusting means hereinafter described. The case 23 is held fixed in the stock by upper end ears 23ª which are countersunk in and secured to the upper edge of the stock as shown by Fig. 2. At a suitable distance below and centrally with relation to the scale plate 26 an arbor or spindle 27 is mounted between the plates 21 and has an indicator or hand 28 fixed thereto and extending upwardly and formed with an angular pointer 29 projecting and freely movable over the plate 26 and support 26ª beneath the glass cover 25. The arbor or spindle 27 also has an actuating stem 30 extending therefrom at right angles to the indicator or hand 28 and is formed with a right angular slide member 31 terminating in an upwardly projecting angular keeper or stop 32. A weight 33 is pivoted at its upper end between the plates 21 and 21ª, as at 34, a suitable distance from the arbor or spindle 27, and has an actuating arm 35 fixed to the upper portion. The weight 33 and arm 35 are made of suitable metal, and the said arm extends downwardly at an angle from the weight over and beyond the arbor or spindle 27 and is formed with an angular depending member 36 terminating in a return right angular bifurcated seat 37 normally disposed in a horizontal plane and loosely and movably engaged by the spindle actuating stem 30. The weight 33 will always tend by gravitation to assume a perpendicular position, and an upward inclination of the stock 5 to the right, effected by the lower edge engaging rails disposed to cause such inclination, will result in a movement of the indicator or hand 28 to the right over the scale plate 26 by the operation of the weight in assuming a perpendicular position as shown by Fig. 6. An upward inclination of the stock 5 to the left, as shown in dotted lines by Fig. 7, will cause the indicator or hand 28 to correspondingly move over the scale plate 26 by a similar operation of the weight. By this means the degree of elevation, whether normal or abnormal, may be readily ascertained by the improved level, the slide member 31 of the stem 30 easily riding in the bifurcated seat 37 and having either a downward or an upward pressure exerted thereon to oscillate the arbor or spindle 27 and the indicator or hand 28 relatively to the scale plate 26. For convenience in transporting and applying the improved combined level and gage, a handle 38 is secured to the upper edge thereof over the glass cover 25, said handle preferably comprising attaching feet 39 and 40 which are secured to the upper edge of the stock 5, the foot 40 being longer than the foot 39 to permit it to extend over a portion of the top of the case 23 to the part of the upper edge of the stock where it is secured.

To the upper portion of the inner side of the plate 21 a pin 41 is secured and projects inwardly to form a mounting for a rocking lever 42 having one extremity formed as a downwardly inclined arm 43 which loosely projects through the slot 26ᵉ at one end of the scale plate 26. The opposite extremity of the lever 42 has an inwardly projecting headed stud 44 which loosely engages a slot 45 in the depending member 46 of an angle bracket 47, the upper horizontal member 48 of said bracket being formed with a screw-threaded opening 49 therethrough to receive the lower screw-threaded stem 50 of an adjusting screw 51. This screw 51 also has an enlarged smooth shank 52 and slotted head 53, the shank 52 being rotatably mounted in the top of the case 23 and a lug or ear 54 projecting inwardly from the upper edge portion of the plate 21. The screw 51 is held against displacement by a pin 55 inserted therethrough below the lug or ear 54, all as shown by Fig. 11. By rotating this screw 51 in opposite directions from the exterior of the case 23, the lever 42 will be rocked in corresponding opposite directions and the arm 43 raised or lowered and either push upwardly or pull downwardly on the scale plate 26 to rectify irregularities of the scale that may be readily ascertained by disposing the stock on a practically true horizontal support and noting the position of the pointer 29 relatively to the scale of said plate. This adjustment of the scale plate 26 is effected only at such times as rectification may be found necessary and whereby the accurate scale readings may be maintained. The head 53 of the screw 51 is normally covered by the foot of the handle, removal or detachment of said handle being necessary before the screw head 53 is accessible for operation of the screw and whereby accidental loosening as well as irregular tampering with the said screw is prevented.

The improved level and gage also embodies locking means for the weight 33, consisting of a pin or short spindle 56 held by or secured to and projecting from the inner lower portion of the plate 21 and carrying a disk or head 57 provided with a radial arm 58 terminating in an angular foot 59 to bear against the adjacent side edge of the weight and hold the latter against swinging movement or jarring action particularly during transportation. This lock is operative from the exterior of the stock 5 by a short radial arm 60 also connected to the disk or head 57 and movably projecting over a portion of the said stock and whereby the head 57 may be swung either right or left to engage the foot 59 of the arm 58 with or disengage said foot from the weight.

From the foregoing it will be seen that the level and gage of the rails of a track may be quickly determined and irregularities, as indicated by the readings of the scale 19 and scale plate 26, may be rectified with assurance of correctness in accordance with standard rail gages and levels required. The improved device is comparatively inexpensive in cost of manufacture and exceptionally convenient in its service as a measuring instrument.

I claim as my invention:

1. A track level and gage indicating device having an intermediate level mechanism including a scale, and fixed loop gage devices at opposite extremities, one extremity also having a supplemental outwardly and inwardly slidable gage coöperating with a scale and comprising a gage arm movable into the adjacent fixed loop gage device when in normal position, the said supplemental gage being provided with means for moving it into normal position.

2. A track level and gage indicating device having a stock with an intermediate level mechanism including a scale, and fixed gage devices at opposite extremities consisting of depending rigid loops with outer vertically straight rail engaging members, and a supplemental spring-actuated slide gage having a depending gage arm associated with one of said loops and movable outwardly and inwardly with relation to said loop.

3. A track level and gage indicating device having a stock with an intermediate level mechanism including a scale, fixed gage devices at opposite extremities of the stock, the stock adjacent to one fixed gage being horizontally and vertically slotted, a rod slidable in the said slot and having a depending gage arm coöperating with the adjacent fixed gage device, the rear extremity being provided with an operating arm terminating in a pointer, a scale in the stock with which said pointer coöperates, and a spring attached to said rod for automatically returning the same and the gage arm thereof to normal position when released.

4. A track level and gage indicating device having a stock with an intermediate level mechanism including a scale, fixed gage devices at opposite extremities of the stock and comprising depending rigid loops, and a supplemental spring-actuated slidable gage comprising an outer depending gage arm movable into and outwardly from the one fixed gage device.

5. A track level and gage indicating device having a stock, and a level mechanism mounted in the intermediate portion of the stock and comprising an upper arcuate scale, a spindle mounted below the scale to have an oscillating movement and provided with an indicator movable relatively to the scale, the spindle also being provided with an actuating stem, and a weight pivoted at its upper extremity and having a rigid arm extending therefrom over and beyond the spindle and terminating in a bifurcated seat to loosely receive and actuate the said stem to cause the indicator to move over the scale.

6. A track level and gage indicating device having a stock, and a level mechanism mounted in the intermediate portion of the stock and comprising an upper arcuate scale having a transparent covering, a spindle below the scale provided with an indicator movable over the scale and also with actuating means, and a weight pivoted at its upper end and having a rigid arm provided with means to loosely receive said actuating means and effect an oscillation of the spindle and the indicator when the stock is disposed in opposite angular positions relatively to a horizontal.

7. A track level and gage indicating device having a stock, and a level mechanism mounted in the intermediate portion of the stock and comprising an upper arcuate scale, a transparent covering for the scale, a spindle disposed below the scale and having a hand movable over the scale and also provided with an actuating stem at right angles to the handle, a weight pivoted at its upper end and free to swing, and an arm rigidly extending from the weight above and beyond the spindle and provided with a terminal bifurcated seat normally in line with the spindle to loosely receive the actuating stem and effect an oscillation of the spindle and hand in accordance with the inclination of the stock in opposite directions relatively to a horizontal plane.

8. In a device of the class specified, a stock, and a level mechanism mounted in the stock and comprising a scale, a spindle below the scale having an indicator movable relatively to the scale and a projecting actuating means, a weight disposed to one side of the spindle and pivoted at its upper end, and a rigid arm secured to the weight and having a free extremity loosely engaging said spindle actuating means.

9. In a device of the class specified, a stock, and a level mechanism mounted in the stock and comprising a scale, a spindle mounted in central relation to the scale and having an indicator movable over the scale, a pivotally mounted weight located at one side of the spindle and indicator, and a rigid means secured to the weight and extending over to and loosely engaging a portion of the spindle to actuate the latter and the indicator.

10. In a device of the class specified, a stock, level mechanism mounted in the stock and comprising a longitudinally shiftable scale, and adjusting means having a portion thereof loosely extending transversely through and engaging one end of the scale to shift the latter longitudinally, said adjusting means being operable from the exterior of the stock.

11. In a device of the class specified, a stock, level mechanism mounted in the stock and comprising a longitudinally shiftable scale having an opening in one end thereof, and adjusting means having a rocking lever with an inclined arm engaging the opening in one end of the scale.

12. In a device of the class specified, a stock, level mechanism mounted in the stock and comprising a longitudinally shiftable scale and adjusting means consisting of a rocking lever having an inclined arm engaging one end of the scale, and a screw accessible exteriorly of the stock for rocking the said lever.

13. In a device of the class specified, a stock, level mechanism mounted in the stock and comprising a longitudinally shiftable scale having an opening in one extremity thereof and adjusting means consisting of a rocking lever having an inclined arm at one extremity loosely engaging the opening in the end of the scale, an angle bracket movably connected to the opposite extremity of the rocking lever, and an adjusting screw engaging a member of the bracket and extending upwardly through and having a head exterior of the stock.

14. In a device of the class specified, a stock, level mechanism mounted in the stock and comprising a scale and indicator means movable thereover, a weight suspended within the stock and connected to said indicator means, and a locking device for the weight consisting of a rotatable head having an arm with an angular foot to engage one edge of the weight.

15. In a device of the class specified, a stock, level mechanism mounted in the stock and comprising a scale and indicator means movable thereover, a weight suspended within the stock and connected to said indicator means, and a locking device for the weight consisting of a rotatable head having an arm with an angular foot to engage one edge of the weight, the head also having means connected thereto and extending exteriorly of the stock for operating the head and arm.

In testimony whereof I have hereunto set my hand in presence of two subscribing witnesses.

BEN A. FULLER.

Witnesses:
J. E. MORGAN,
ROY DAVIS.

Copies of this patent may be obtained for five cents each, by addressing the "Commissioner of Patents, Washington, D. C."